United States Patent
Bryant (10) Patent No.: US 11,001,186 B2
(45) Date of Patent: May 11, 2021

(54) SLIDE AND CANTILEVER RAMP SYSTEM

(71) Applicant: GM GLOBAL TECHNOLOGY OPERATIONS LLC, Detroit, MI (US)

(72) Inventor: Wade W. Bryant, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 209 days.

(21) Appl. No.: 16/277,064

(22) Filed: Feb. 15, 2019

(65) Prior Publication Data

US 2020/0262327 A1 Aug. 20, 2020

(51) Int. Cl.
*B60P 1/43* (2006.01)
*B60P 1/64* (2006.01)

(52) U.S. Cl.
CPC .............. *B60P 1/433* (2013.01); *B60P 1/649* (2013.01); *B60P 1/6436* (2013.01); *B60P 1/6454* (2013.01)

(58) Field of Classification Search
CPC ......... B60P 1/649; B60P 1/4457; B60P 1/433; B60P 1/16436; B60P 1/6454; B60P 1/4492
See application file for complete search history.

(56) References Cited

U.S. PATENT DOCUMENTS

| | | | | |
|---|---|---|---|---|
| 3,168,959 A | * | 2/1965 | Chandler | B60P 1/6454 414/500 |
| 3,870,126 A | * | 3/1975 | Himes | B60P 1/4457 187/403 |
| 4,470,747 A | * | 9/1984 | Tichenor | B65F 3/001 298/13 |
| 4,792,274 A | * | 12/1988 | Cockram | B60P 1/433 14/71.1 |
| 5,046,913 A | * | 9/1991 | Domek | B60P 1/433 414/522 |
| 5,683,221 A | * | 11/1997 | Ablabutyan | B60P 1/4457 410/94 |
| 7,407,352 B2 | * | 8/2008 | Wilson | B60P 7/0892 410/19 |
| 8,382,420 B2 | * | 2/2013 | Ablabutyan | B66F 7/28 414/556 |
| 8,920,082 B2 | * | 12/2014 | Bryant | B60P 3/07 410/4 |
| 9,550,442 B2 | * | 1/2017 | Hanson, Jr. | B60P 1/6454 |
| 9,555,731 B2 | * | 1/2017 | Konchan | B60P 1/02 |
| 10,493,893 B2 | * | 12/2019 | Matsuoka | B60P 1/436 |
| 2015/0086313 A1 | * | 3/2015 | Perez | B60R 9/06 414/537 |

* cited by examiner

*Primary Examiner* — Mark C Hageman
(74) *Attorney, Agent, or Firm* — Quinn IP Law (57) ABSTRACT

An exemplary ramp system for an automotive vehicle includes a ramp member including an upper ramp surface and a lower ramp surface, the upper ramp surface including a retention feature, a first channel, and a second channel, the lower ramp surface including a guide member, a platform including an upper platform surface and a lower platform surface, the upper platform surface including a guide rail and a support assembly, and a drive assembly coupled to the platform. The drive assembly is actuatable to move the ramp member relative to the platform.

18 Claims, 8 Drawing Sheets

SLIDE AND CANTILEVER RAMP SYSTEM

INTRODUCTION

The present invention relates generally to ramp loading systems and, more specifically, to a ramp system for a vehicle for loading/unloading and locking wheeled containers.

Current solutions to load and lock down wheeled containers typically require a series of sequential steps, including: 1) deploying a ramp or lift, 2) loading a wheeled container on the ramp/lift, 3) moving the container to the vehicle bed, and 4) manually locking down the wheeled container. This process consumes valuable time and creates potential safety hazards for operators who follow the cargo on and off the vehicle bed. Additionally, current solutions also take up considerable valuable footprint space around the vehicle while the same lifts and ramps consume space on the vehicle when not in use.

SUMMARY

Embodiments according to the present disclosure provide a number of advantages. For example, embodiments according to the present disclosure enable integration of lift, securing, and carrying functions into a single ramp system.

In one aspect, a ramp system for an automotive vehicle includes a ramp member including an upper ramp surface and a lower ramp surface, the upper ramp surface including a retention feature, a first channel, and a second channel, the lower ramp surface including a guide member, a platform including an upper platform surface and a lower platform surface, the upper platform surface including a guide rail and a support assembly, and a drive assembly coupled to the platform. In some aspects, the drive assembly is actuatable to move the ramp member relative to the platform.

In some aspects, the drive assembly is a screw drive assembly includes a rotatable screw and a drive fork coupled to the screw.

In some aspects, the ramp member further comprises a drive fork attachment member extending from the lower ramp surface, the drive fork attachment member configured to engage with the drive fork of the drive assembly such that actuation of the screw of the drive assembly translates the ramp member from a first position to a second position.

In some aspects, the retention feature is an engagement member pivotable from a disengaged position flush with the upper ramp surface and an engaged position extending from the upper ramp surface.

In some aspects, the engagement member is a hook.

In some aspects, the engagement member is enclosed by a housing embedded in the upper ramp surface and the engagement member is coupled to an actuation system, the actuation system configured to move the engagement member from a first position to a second position and vice versa.

In some aspects, the first channel engages with a retention feature of a container and the second channel engages with a wheel of the container and the first channel and the second channel are spaced apart a predetermined distance based on a length of the container.

In some aspects, the platform is coupled to a chassis of the automotive vehicle.

In some aspects, the upper platform surface comprises a tray and the support assembly is disposed within the tray, the support assembly including a support member rotatably coupled to the platform via a hinged connection, wherein the support member acts on the lower ramp surface to raise the ramp member from a first loading position to a second loading position.

In some aspects, the lower ramp surface further comprises a plurality of lockdown members.

In some aspects, the guide rail includes a flange that defines a channel and the guide member travels within the channel to maintain alignment of the ramp member relative to the platform.

In another aspect, a storage system for a vehicle includes a ramp member including an upper ramp surface and a lower ramp surface, the upper ramp surface including a retention feature, a first channel, and a second channel, the lower ramp surface including a guide member, a platform including an upper platform surface and a lower platform surface, the upper platform surface including a guide rail and a support assembly, a drive assembly coupled to the platform, and a container including a body, a plurality of wheels coupled to the body, and at least one lockdown rail coupled to an underside of the body. In some aspects, the drive assembly is actuatable to move the ramp member relative to the platform.

In some aspects, the drive assembly is a screw drive assembly including a rotatable screw and a drive fork coupled to the screw and the ramp member further comprises a drive fork attachment member extending from the lower ramp surface, the drive fork attachment member configured to engage with the drive fork of the drive assembly such that actuation of the screw of the drive assembly translates the ramp member from a first position to a second position.

In some aspects, the retention feature is an engagement member pivotable from a disengaged position flush with the upper ramp surface and an engaged position extending from the upper ramp surface.

In some aspects, the engagement member is a hook and the engagement member is enclosed by a housing embedded in the upper ramp surface and the engagement member is coupled to an actuation system, the actuation system configured to move the engagement member from the engaged position to the disengaged position and vice versa.

In some aspects, the container comprises a first lockdown rail and a second lockdown rail spaced apart from and parallel to the first lockdown rail, the first channel engages with the first lockdown rail and the engagement member engages with the second lockdown rail.

In some aspects, the platform is coupled to a chassis of the vehicle.

In some aspects, the upper platform surface comprises a tray and the support assembly is disposed within the tray, the support assembly including a support member rotatably coupled to the platform via a hinged connection, wherein the support member acts on the lower ramp surface to raise the ramp member from a first loading position to a second loading position.

In some aspects, the guide rail includes a flange that defines a channel and the guide member travels within the channel to maintain alignment of the ramp member relative to the platform.

In yet another aspect, an automotive vehicle includes a chassis and a storage system coupled to the chassis. The storage system includes a ramp member including an upper ramp surface and a lower ramp surface, the upper ramp surface including an engagement member, a first channel, and a second channel, the lower ramp surface including a guide member and a drive fork attachment member, a platform including an upper platform surface and a lower platform surface, the upper platform surface including a guide rail and a support assembly disposed within a tray, the support assembly including a support member rotatably coupled to the platform via a hinged connection, wherein the support member acts on the lower ramp surface to raise the ramp member from a first loading position to a second loading position, a drive assembly coupled to the platform, the drive assembly including a rotatable screw and a drive fork coupled to the screw, and a container including a body, a plurality of wheels coupled to the body, a first lockdown rail coupled to an underside of the body, and a second lockdown rail spaced apart from the first lockdown rail and coupled to an underside of the body. In some aspects, the engagement member engages with the second lockdown rail and the drive fork attachment member of the ramp member engages with the drive fork of the drive assembly such that actuation of the screw of the drive assembly moves the ramp member relative to the platform.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Urban densification creates an opportunity for containerized vehicle cargo that can be rapidly loaded and unloaded curbside. In some embodiments, electrified, autonomous vehicles provide an ideal platform for containerized urban delivery. Current lift, ramp, and cargo securing systems are slow to deploy, require multiple manual actions by employees, and take up significant space around and above the vehicle. Embodiments of the ramp system disclosed herein minimize the loading footprint around the vehicle and maintain low overhead clearances for parking garage compatibility. The embodiments disclosed herein accomplish the heavy lifting and securing of cargo automatically and swiftly. While discussed in the context of use with an autonomous vehicle, it is understood that the embodiments of the ramp system disclosed herein may be used with any type of autonomous, semi-autonomous, or driver-operated vehicle of any vehicle type including, for example and without limitation, trucks, SUVs, mobile platforms, etc.

Figure 1:
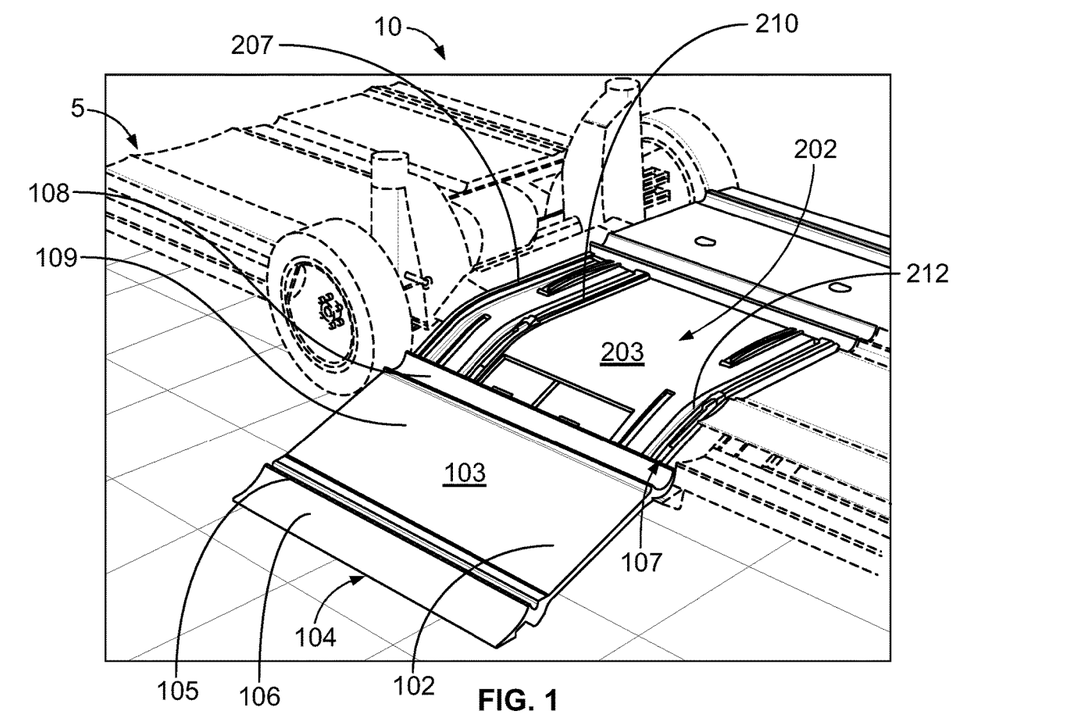
FIG. 1 is an illustration of a ramp system including a ramp member and a platform, according to an embodiment.

FIG. 1 illustrates a ramp system 10, according to an embodiment. The ramp system 10 may be coupled to the chassis of a vehicle 5, as shown in FIG. 1 using any type of mechanical or chemical coupling means such as fasteners or welding. The ramp system 10 includes a movable ramp member 102 and a stationary platform 202. The ramp system 10 is configured to interface with a wheeled container, as described in greater detail herein.

The ramp member 102 is moveable from a first or loading position in which the ramp member 102 extends toward and, in some embodiments, contacts the ground, as shown in FIG. 1, and a second, or loaded position. The ramp member 102 includes a substantially planar ramp surface 103. The ramp surface 103 defines a support surface for the wheeled container and includes one or more retention features for loading and retaining the container. A first end of the ramp member 102 curves downward from the substantially planar ramp surface 103 and includes a first edge 104. The first edge 104 extends longitudinally with respect to the vehicle 5 and defines the outermost or outboard edge of the ramp member 102 when the ramp member 102 is extended into the loading position. A first channel 105 is separated from the first edge 104 of the ramp member 102 by a concave loading surface 106. The loading surface 106 provides a connection surface between the ground and the ramp surface 103 to facilitate loading the wheeled container onto the ramp surface 103. In some embodiments, the first channel 105 engages with a retention feature of the wheeled container.

A second end of the ramp member 102 includes a second edge 107. The second edge 107 is spaced from and parallel to the first edge 104. The second edge 107 also extends longitudinally with respect to the vehicle 5 and defines the innermost or inboard edge of the ramp member 102. The second edge 107 defines one edge of a second channel 108. In some embodiments, the second channel 108 is a trough that receives one or more wheels of the wheeled container. During a loading operation, the wheeled container is moved along the surface 103 of the ramp member 102 until the forward wheels of the container engage with the second channel 108 and a retention feature of the container engages with the first channel 105. In some embodiments, the second channel 108 has a width greater than the first channel 105.

With continued reference to FIG. 1, in some embodiments, the ramp surface 103 includes one or more engagement members 109. In some embodiments, the engagement members 109 are hooks coupled to the ramp surface 103. The engagement members 109 are coupled to the ramp surface 103 such that in a disengaged position the engagement members 109 are substantially flush with the surface 103 and in an engaged position extend from the ramp surface 103 to engage with a retention member of the wheeled container, as described in greater detail herein. In some embodiments, the engagement members 109 are mechanically triggered to move from the disengaged position to the engaged position by, for example and without limitation, pressure on a contact point that triggers release or actuation of the engagement members 109. In some embodiments, the engagement members 109 are electronically triggered such as, for example and without limitation, by an actuator coupled to a controller, such as a vehicle controller. In other embodiments, any means of mechanical or electronic actuation or release of the engagement members 109 may be used.

Figure 9:
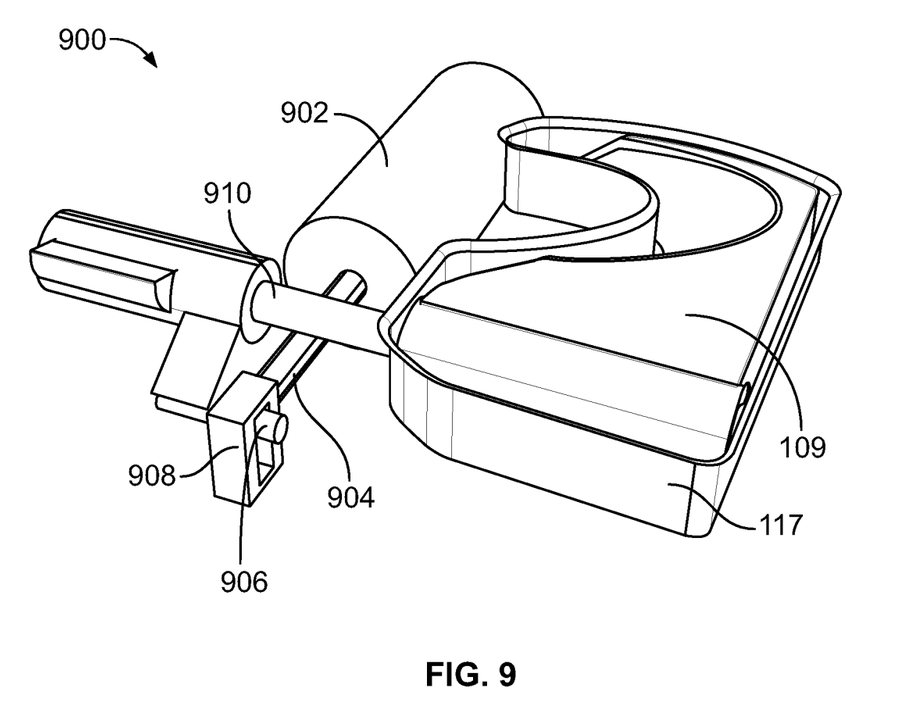
FIG. 9 is an illustration of an engagement member for use with the ramp system of FIG. 1, according to an embodiment.

In the retracted or disengaged position, as shown in FIG. 9, the engagement member 109 is enclosed by a housing 117. The housing 117 is enclosed within an opening in the ramp surface 103 such that the engagement member 109 is substantially flush with the surface 103 so as to not interfere with travel of the wheeled container along the surface 103 during a loading or unloading operation. In some embodiments, each engagement member 109 is independently, mechanically operated. As shown in FIG. 9, the engagement member 109 is coupled to a linear actuator 902. The linear actuator 902 acts on a rod 904 that in turn translates a pin 906 within a sleeve 908. The pin 906 is coupled to or integrally formed with a positioning member 910. The positioning member 910 is coupled to one end of the engagement member 109. As the pin 906 translate within the sleeve 908, the positioning member 910 is rotated, resulting in rotation of the engagement member 109 out of the housing 117 and to the engaged position. Similarly, release of the linear actuator 902 or actuation of the rod 904 in the opposite direction retracts the engagement member 109 to the disengaged position.

As shown in FIG. 1, the ramp member 102 is slidable with respect to a platform 202 from a retracted, or loaded, position to an extended, or loading, position, and vice versa. In some embodiments, the platform 202 is coupled directly or indirectly to the chassis of the vehicle 5. The platform 202 remains stationary and fixed to the vehicle 5 as the ramp member 102 moves relative to the platform 202 and the vehicle 5 during loading and unloading operation. The ramp member 102 is configured to slide perpendicularly away from the vehicle to facilitate loading a wheeled container, as described herein and as shown in FIG. 1.

Figure 5:
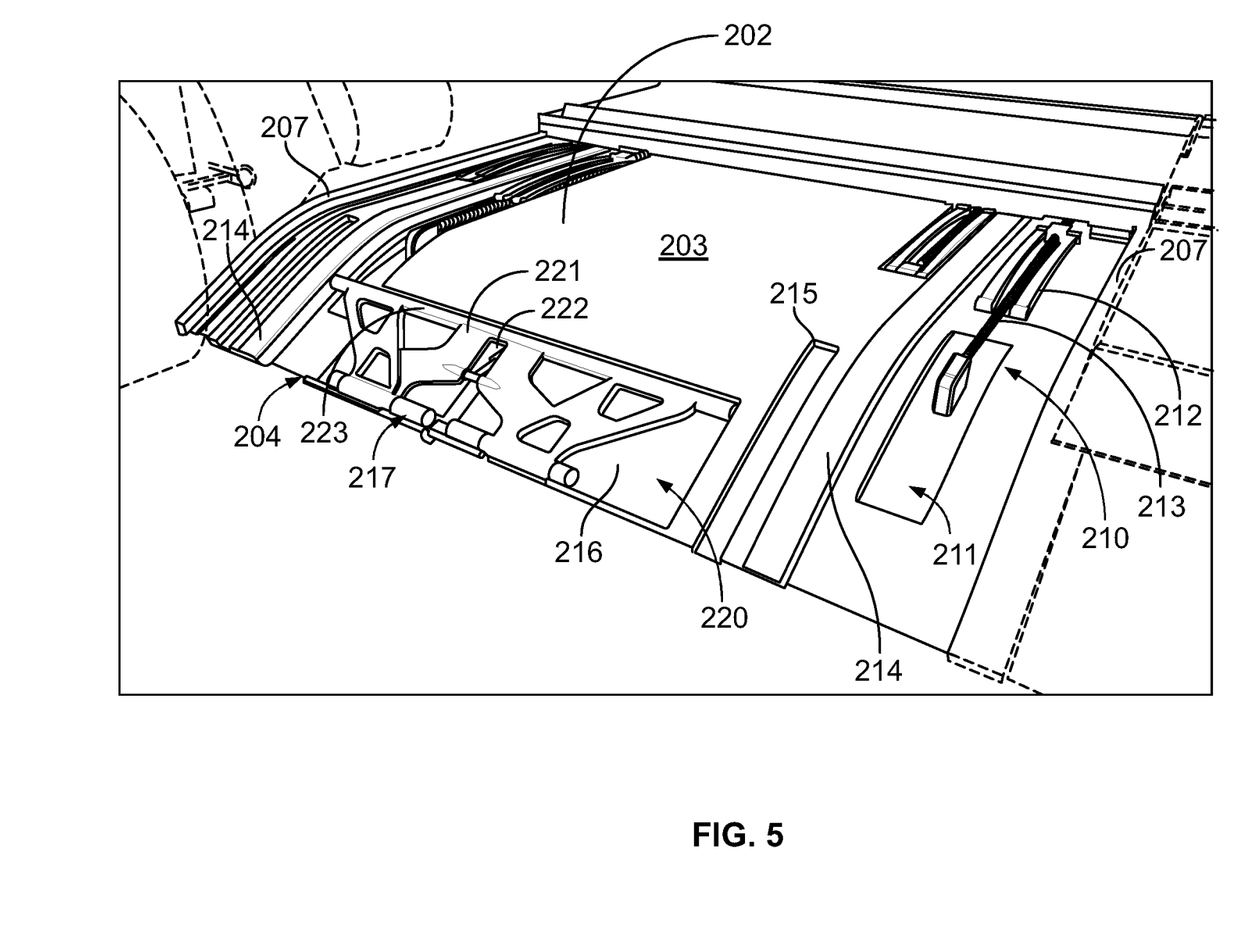
FIG. 5 is an illustration of components of the platform of the ramp system, according to an embodiment.

With continued reference to FIG. 1 and with additional reference to FIG. 5, the platform 202 includes a substantially planar platform surface 203. The platform surface 203 curves downward to facilitate loading and unloading operation of the wheeled container. The platform surface 203 defines a slide surface along which the wheeled container can translate during loading and unloading operations. A first end of the platform 202 curves downward from the substantially planar platform surface 203 and includes a first edge 204. The first edge 204 defines an outermost, or outboard, edge of the platform 202.

With reference to FIGS. 1 and 5, the platform 202 includes at least one guide rail 207. The guide rail 207 is positioned along a lateral edge of the platform surface 203 substantially perpendicular to the first edge 204. In some embodiments, a guide rail 207 is located on either side of the platform surface 203 to facilitate loading and unloading of the container along a straight line perpendicular to the longitudinal axis of the vehicle 5.

In some embodiments, at least one drive assembly 210 is coupled to the platform 202. In some embodiments, two drive assemblies 210 are coupled to the platform 202 and are distributed across the width of the platform 202. In some embodiments, each of the drive assemblies 210 extend within channels 211 formed in the platform surface 203 such that the drive assembly 210 does not impede travel of the ramp member 102 during loading and unloading operations.

As shown in FIG. 5, in some embodiments, each of the drive assemblies 210 is a screw drive assembly including a drive fork 212 driven by a rotating screw 213. The drive fork 212 couples to a drive fork attachment of the ramp member 102. The drive fork 212 is driven by the rotating screw 213 such that the drive fork 212 translates inward and outward relative to the vehicle chassis. The drive fork 212 engages with the ramp member 102 such that the drive assembly 210 translates the ramp member 102 from the extended or loading position to the retracted or loaded position and vice versa. In some embodiments, the drive assemblies 210 are connected via a wired or wireless connection to a controller, such as the controller 1002 shown in FIG. 10. The controller 1002 may be a vehicle controller or any other controller located on or in communication with the vehicle 5.

With continued reference to FIG. 5, in some embodiments, the platform 202 further includes at least one grab ramp slide surface 214, and preferably, two grab ramp slide surfaces 214. The grab ramp slide surfaces 214 extend upward or away from the platform surface 203 to provide a smooth, raised surface along which the ramp member 102 can slide or translate during loading and unloading operations. The grab ramp slide surfaces 214 are distributed across the width of the platform 202 to distribute the load of the container and the ramp member 102 during loading and unloading operation.

FIG. 5 illustrates that the platform 202 further includes a tray 216 formed in the platform surface 203. The tray 216 is a depressed surface configured to accommodate a ramp support assembly 220. The support assembly includes a support member 221. In some embodiments, the support member 221 is a Y-shaped member or a plurality of Y-shaped members connected by a support bar 223 at a first, or upper, end of the support member 221.

The support member 221 is rotatably connected to the platform 202 via a hinged connection 217. In some embodiments, the hinged connection is a pin received within one or more openings at a second, or lower, end of the support member 221 opposite the first end. The support member 221 is actuated from a first, or retracted position, to a second, or extended position, by an actuator 222. The actuator 222 may be any type of mechanical actuator such as a push rod coupled to the support member 221. In some embodiments, the actuator 222 is disposed within a channel formed in the platform surface 203. In some embodiments, the actuator 222 is connected via a wired or wireless connection to a controller, such as the controller 1002 shown in FIG. 10. The controller may be a vehicle controller or any other controller located on or in communication with the vehicle 5.

Figure 2:
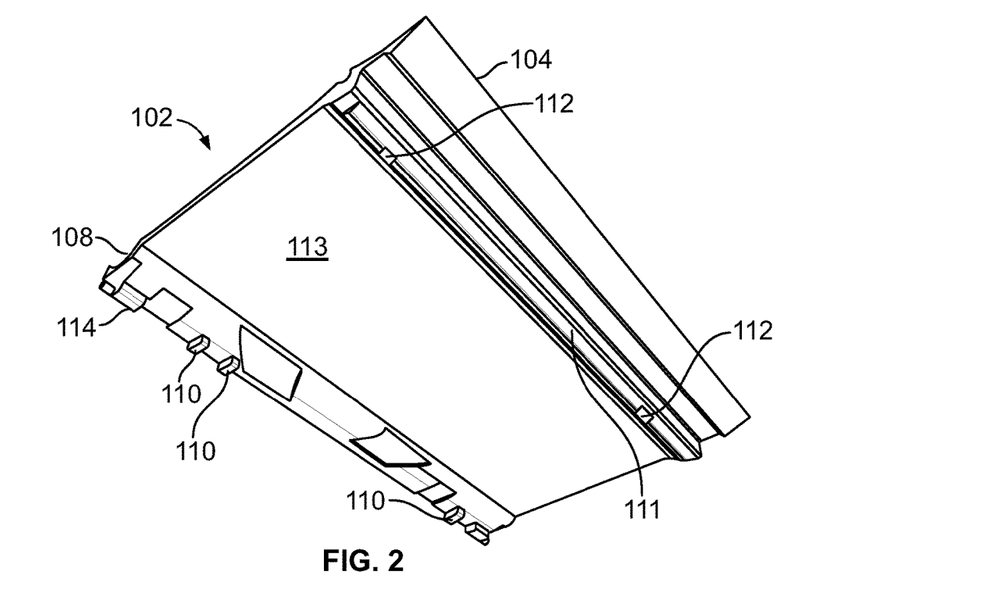
FIG. 2 is an illustration of a ramp member of the ramp system of FIG. 1, according to an embodiment.
Figure 3:
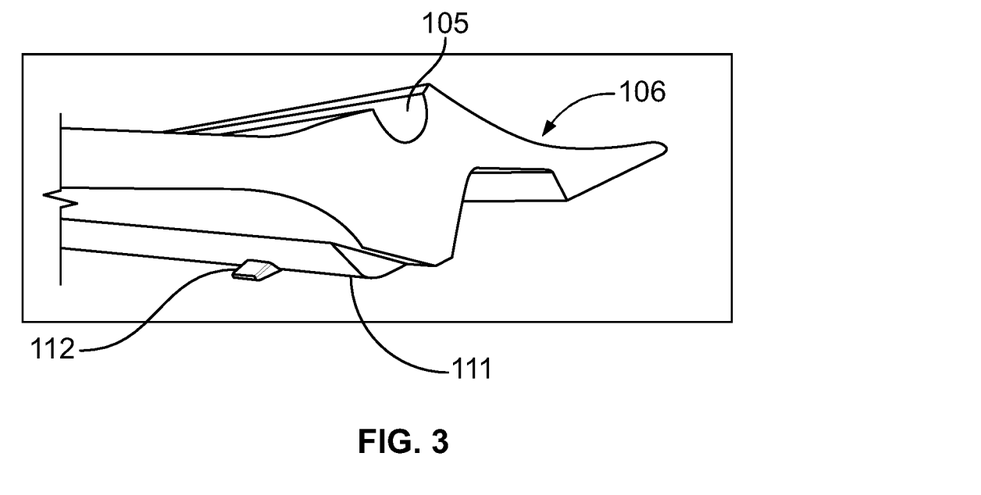
FIG. 3 is a partial view of the ramp member of FIG. 2, according to an embodiment.

FIGS. 2 and 3 illustrate alternate views of the ramp member 102. FIG. 2 illustrates a view of the underside of the ramp member 102. FIG. 3 illustrates a partial side view of the ramp member 102. As shown in FIG. 2, an underside surface 113 of the ramp member 102 includes a plurality of drive fork attachment members 110. The drive fork attachment members 110 are discrete projections that extend downward from underside surface 113 of the ramp member 102. In some embodiments, the drive fork attachment members 110 are rectangular projections; however, in other embodiments, the drive fork attachment members 110 may be any shape. The drive fork attachment members 110 may be integrally formed with the ramp member 102, if the ramp member 102 is formed using a casting process, or may be welded or otherwise joined to the ramp member 102. The drive fork attachment members 110 engage with the drive fork 212 of the drive assembly 210. Activation of the drive assembly 210 rotates the screw 213 to translate the drive fork 212 inboard and outboard, depending on the direction of rotation of the screw 213. The drive fork 212 acts on the drive fork attachment members 110 to extend and retract the ramp member 102. As shown in FIG. 2, in some embodiments, the ramp member 102 includes two sets of drive fork attachment members 110. Each set of drive fork attachment members In some embodiments, the underside 113 of the ramp member 102 also includes a plurality of lockdown members 112, as shown in FIGS. 2 and 3. In some embodiments, one lockdown member 112 is adjacent to a first side of the ramp member 102 and a second lockdown member 112 is adjacent to a second side of the ramp member 102 opposite the first side. In some embodiments, the lockdown members 112 extend from a flange 111. The lockdown members 112 are, in some embodiments, wedge-shaped members that engage with a retention feature on the platform 202 or the chassis of the vehicle 5 to secure the ramp member 102 in a loaded position.

Figure 4:
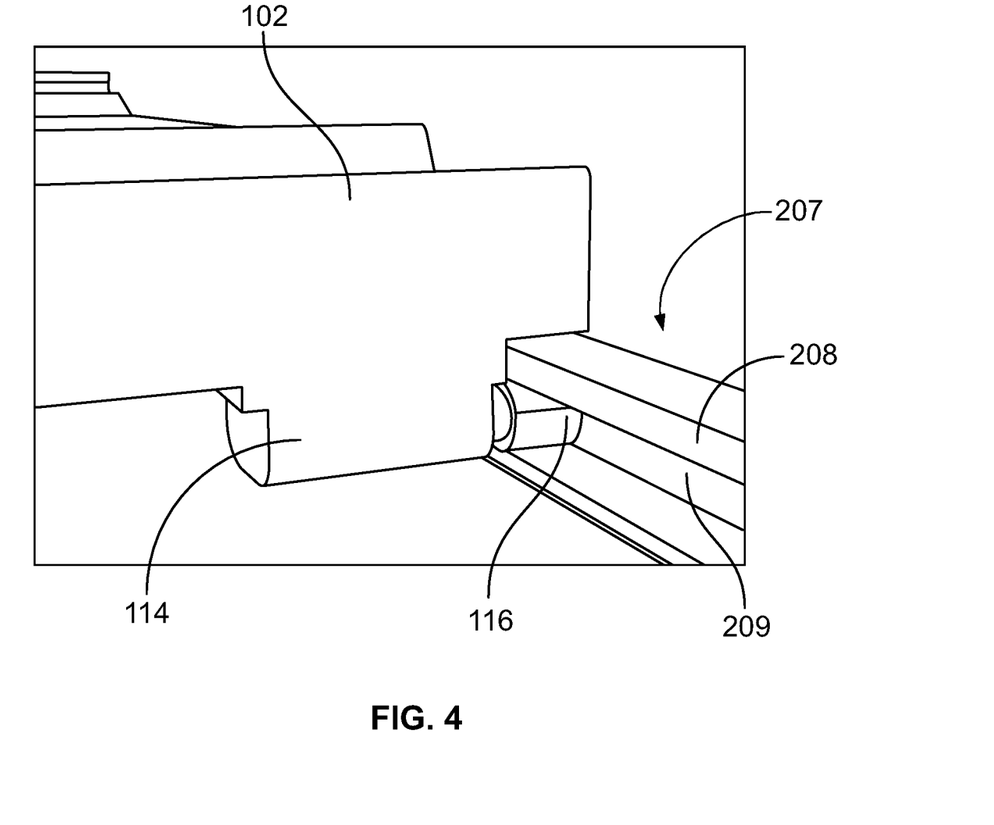
FIG. 4 is a partial view of a connection between the ramp member and a platform of the ramp system, according to an embodiment.

A shown in FIG. 4, in some embodiments, the ramp member 102 engages with the guide rail or rails 207 to maintain alignment of the ramp member 102 with respect to the platform 202 as the ramp member 102 translates between the extended position and the retracted position and vice versa. The ramp member 102 includes at least one receiving member 114 configured to retain a guide member 116. In some embodiments, the guide member 116 is a pin. The guide rail 207 includes a flange 208 that defines a channel 209. The guide member 116 travels within the channel 209 to maintain alignment and orientation of the ramp member 102 relative to the platform 202 during translation of the ramp member 102 such that the ramp member 102 slides smoothly and evenly between the loading and unloading positions.

When the ramp member 102 is in the extended position, or a first loading position, as shown in FIG. 1, the ramp member 102 is pivotable relative to the platform 202 about the receiving members 114. The receiving members 114, in addition to receiving the guide member 116, also provide a fixed point around which the ramp member 102 can pivot to a second, or raised, loading position prior to being drawn inward by the drive assembly 210 during a loading operation. Similarly, during an unloading operation, the drive assembly 210 translates the ramp member 102 from the raised or second loading position to the extended or first loading position and the ramp member 102 pivots about the receiving members 114 to lower the first edge 104 of the ramp member 102 adjacent to or in contact with the ground.

Figure 6:
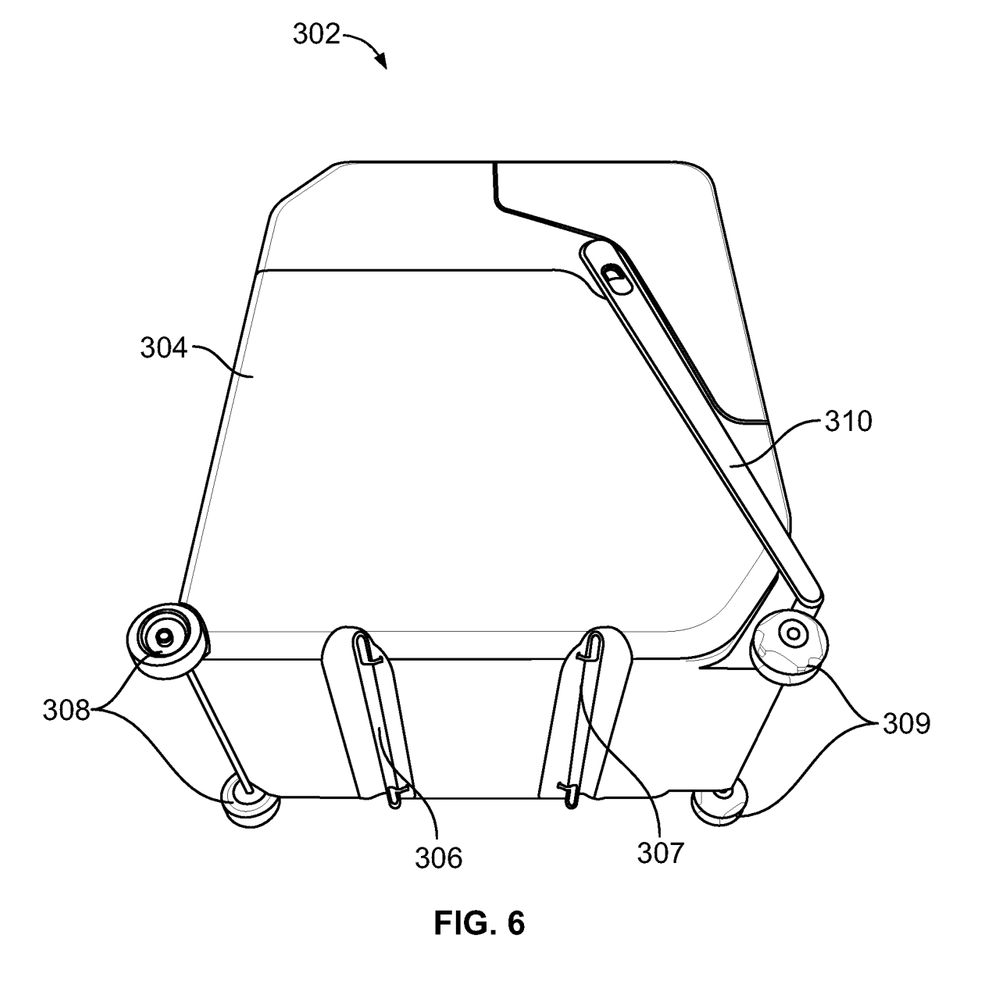
FIG. 6 is an illustration of a wheeled container for use with the ramp system of FIG. 1, according to an embodiment.

FIG. 6 illustrates a wheeled container 302, according to an embodiment. The container 302 is configured to be used with the ramp system 10 shown in FIGS. 1-5 as further illustrated in FIGS. 7-11. The container 302 includes a container body 304. In some embodiments, the container body 304 is a substantially rectangular box defining an interior volume and including a plurality of wheels 308, 309. The wheels 308, 309 are located adjacent to the lower corners of the container body 304 to facilitate rolling the container 302 onto and off of the ramp member 102.

The container 302 also includes at least one lockdown rail 306. As shown in FIG. 6, in some embodiments, the container 302 includes a first lockdown rail 306 and a second lockdown rail 307. The lockdown rails 306, 307 are coupled to the underside of the container body 304 and are oriented parallel to the front and rear sides of the container 302, that is, orthogonal to the direction of travel as the container 302 is loaded onto the ramp member 102. The first and second lockdown rails 306, 307 are spaced apart and parallel to each other such that the wheeled container 302 may be loaded and secured to the ramp member 102 with either the front of the container 302 facing inboard or vice versa.

Figure 7:
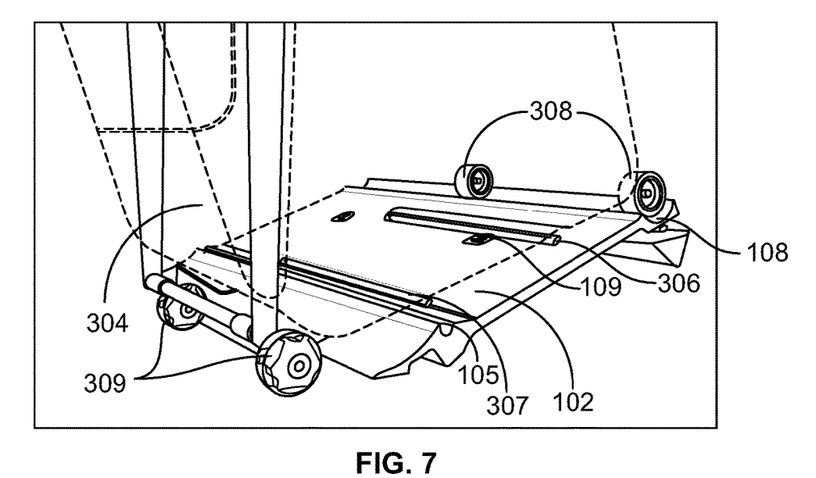
FIG. 7 is an illustration of a step in a container loading process using the wheeled container of FIG. 6 and the ramp system of FIG. 1, according to an embodiment.
Figure 8:
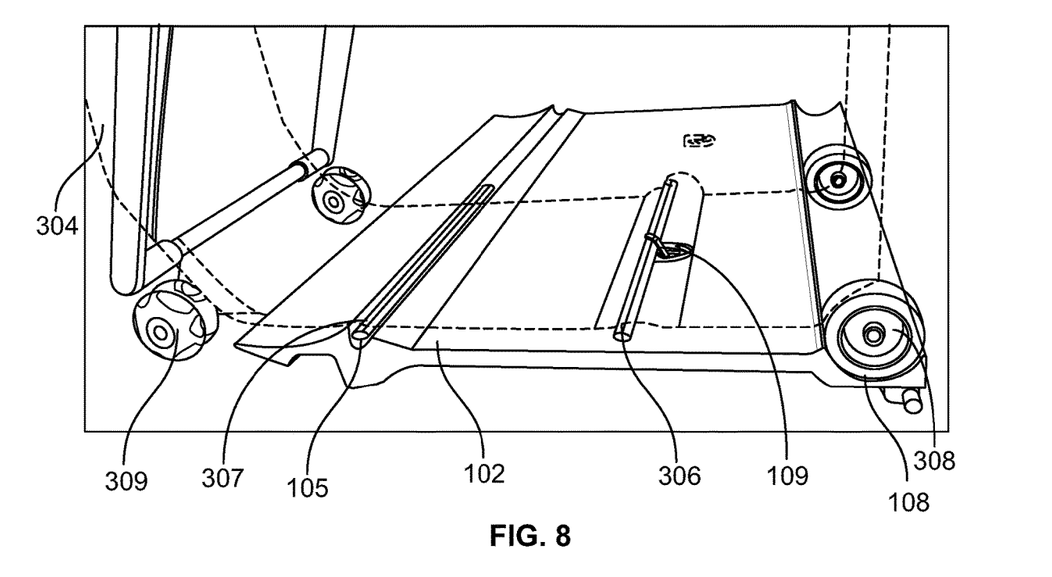
FIG. 8 is an illustration of another step in a container loading process using the wheeled container of FIG. 6 and the ramp system of FIG. 1, according to an embodiment.

FIGS. 7 and 8 illustrate two steps in a container loading process, according to an embodiment. As shown in FIG. 7, the wheeled container 302 is rolled up the ramp member 102 until the wheeled container 302 is in a loading position in which the wheels 308 are nested in the second channel 108. When the wheels 308 are nested in the second channel 108, the first lockdown rail 306 is aligned with the engagement member 109. Activation of the engagement member 109 removably couples the wheeled container 302 to the ramp member 102. When the wheeled container 302 is in the loading position, the second lockdown rail 307 is aligned with the first channel 105.

As shown in FIG. 8, the ramp member 102 is lifted from a disengaged position to an engaged position with respect to the wheeled container 302. In the engaged position, the second lockdown rail 307 is nested within the first channel 105. The engagement member 109 is actuated or triggered by any triggering means such as, for example, a mechanical trigger or an electronic trigger, to an engaged position in which the engagement member 109 interfaces with the first lockdown rail 306. In some embodiments, as shown in FIG. 8, the engagement member 109 is a hook that is released from a position substantially flush with the ramp surface 103 to an engaged position. In the engaged position, the hook at least partially encircles the first lockdown rail 306 to secure the container 302 to the ramp member 102.

Figure 10:
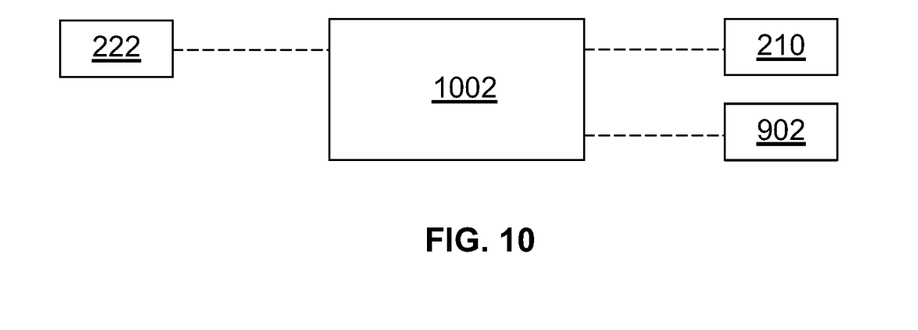
FIG. 10 is a schematic block diagram of a control system for use with the ramp system of FIG. 1, according to an embodiment.

As shown in FIG. 9, the engagement member 109 is received within an opening defined by a housing 117. The housing 117 is received within an opening in the ramp surface 103, as shown in FIG. 8. The engagement member 109 is actuated by any mechanical or electronic means, including an actuation system, such as the system 900 shown in FIG. 9. The actuation system 900 includes, in some embodiments, an actuator 902 coupled with a first actuation member 904. The first actuation member 904 acts on a second actuation member 906. The second actuation member 906 translates within a sleeve 908 in response to movement of the first actuation member 904. The second actuation member 906 is respectively coupled to, or formed integrally with, a third actuation member 910. The third actuation member 910 is coupled to the engagement member 109.

In some embodiments, the actuator 902 is a linear actuator controlled by a controller, such as the controller 1002 shown in FIG. 10. Linear movement of the first actuation member 904 acts on the second actuation member 906 such that the second actuation member 906 translates vertically (as shown in FIG. 9) within the sleeve 908. The vertical translation of the second actuation member 906 results in rotational movement of the third actuation member 910. The rotational movement of the third actuation member 910 rotates the engagement member 109 out of and into the housing 117, depending on the direction of rotation of the third actuation member 910. It is understood that one embodiment for actuating the engagement member 109 is shown in FIG. 9; however, in other embodiments, other means of actuating the engagement member 109 may be used, including, for example and without limitation, electronic actuation or other arrangements of mechanical actuation members.

FIGS. 11A-F graphically illustrate a loading process to load and secure a wheeled container on a vehicle. The process can be utilized in connection with the wheeled container and ramp system illustrated in FIGS. 1-10. The process can be utilized in connection with a vehicle controller as discussed herein, or by other systems associated with or separate from the vehicle, in accordance with exemplary embodiments. The order of operation of the process is generally guided by the sequential execution as illustrated in FIGS. 11A-F, but may be performed in one or more varying orders, or steps may be performed simultaneously, as applicable in accordance with the present disclosure.

Figure 11A:
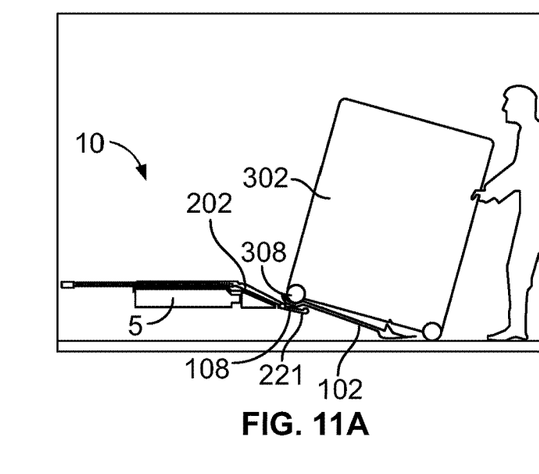
FIGS. 11A-F illustrate a loading sequence for a wheel container, such as the container shown in FIG. 6, with a ramp system, such as the ramp system of FIG. 1, according to an embodiment.

As shown in FIG. 11A, the container 302 is wheeled toward the ramp system 10. The ramp member 102 is extended downward (that is, toward the ground and away from the vehicle 5 and the platform 202) to a first loading position. The ramp support assembly 220 is in an extended position such that the support member 221 is extended underneath the ramp member 102. The wheels 308 are pushed up the ramp member 102 until the wheels 308 engage with the second channel 108.

Figure 11B:
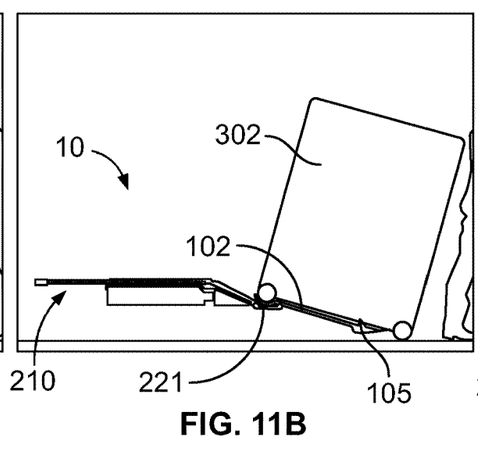

Next, as shown in FIG. 11B, the ramp member 102 is lifted from the first loading position to a second loading position. The underside ramp surface 113 is acted on by the support member 221 such that the ramp member 102 pivots upward about the pivot member 111. As the ramp member 102 pivots upward, the retention features of the ramp member 102 engage with one or more underside attachment features of the container 302. As shown in FIGS. 7 and 8 and discussed above, in some embodiments, the first channel 105 engages with the second lockdown rail 307 and the engagement member 109 engages with the first lockdown rail 306.

Figure 11C:
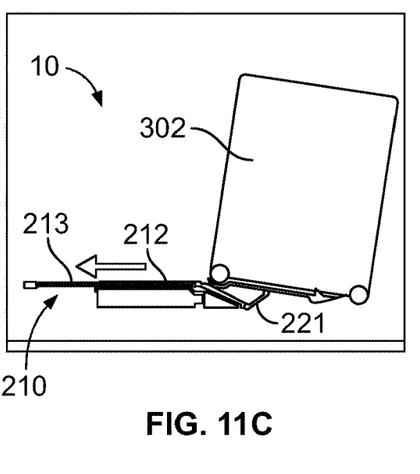

With reference to FIG. 11C, the support member 221 extends upward to support and maintain the wheeled container 302 in a substantially level position. The ramp member 102 is positioned such that the drive fork attachments 110 engage with the drive fork 212 of the drive assembly 210. The screw 213 of the drive assembly 210 rotates to pull the wheeled container 302 toward and up the platform 202.

Figure 11D:
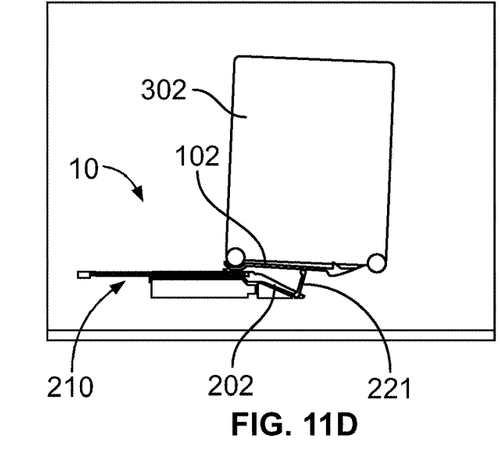
Figure 11E:
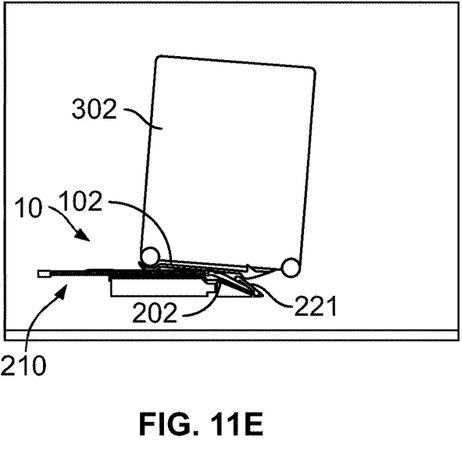

As the loading process continues, as shown in FIG. 11D, the support member 221 continues to support the ramp member 102 as the ramp member 102 progresses up the platform 202. With continued translation of the ramp member 102 onto the platform 202, the support member 221 pivots to the retracted or stored position shown in FIG. 11E. The drive assembly 210 continues to pull the ramp member 102 and the wheeled container 302 further along the slide surface defined by the platform surface 203 toward a loaded position.

Figure 11F:
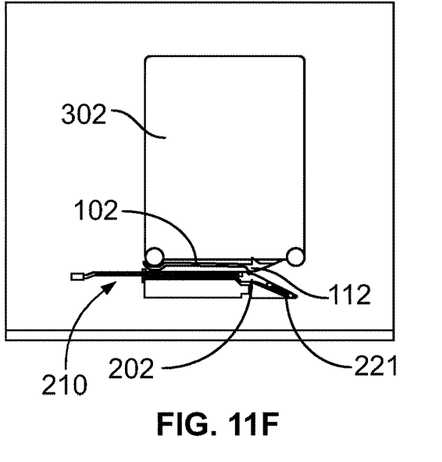

FIG. 11F illustrates the wheeled container 302 in a loaded position. In the loaded position, the ramp member 102 is fully retracted and secured to the platform 202 and/or the chassis of the vehicle 5 via the engagement of the lockdown members 112 with a lockdown retention feature. The support member 221 is fully retracted and enclosed within the tray 216.

For an unloading operation, the process shown in FIGS. 11A-F is reversed. In some embodiments, a controller, such as a vehicle controller or other controller associated with the vehicle 5, or a controller in wireless communication with the ramp system 10, actuates the support member 221 and/or the drive assembly 210. In some embodiments, actuation of the components of the ramp system 10, including the support member 221 and/or the drive assembly 210, is in response to user input. In some embodiments, actuation of the support member 221 and/or the drive assembly is in response to sensor data received by a controller, such as a vehicle controller.

Figure 12:
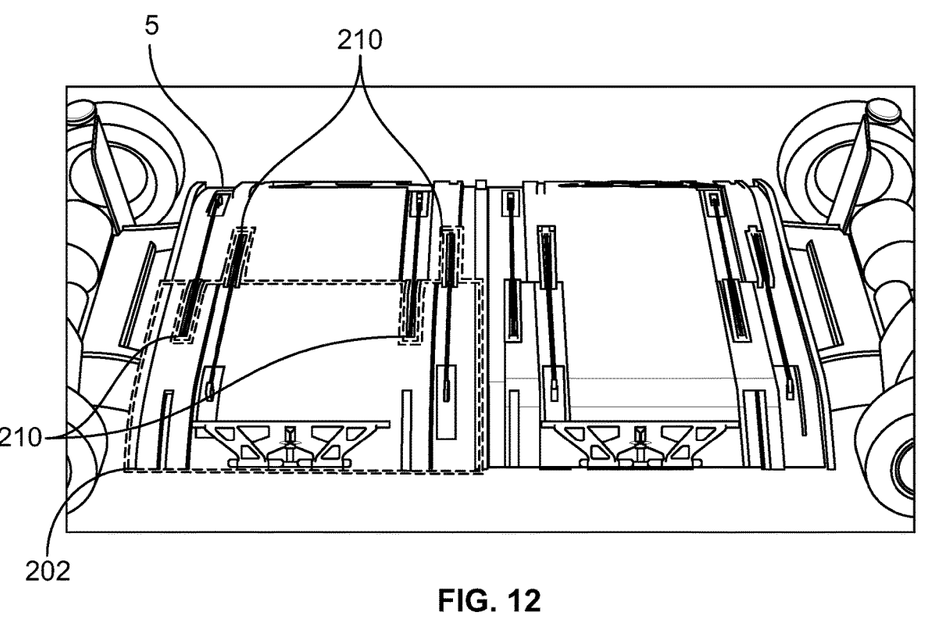
FIG. 12 is an illustration of platforms of a ramp system, according to an embodiment.

In some embodiments, a plurality of ramp systems 10 are coupled to the chassis of the vehicle 5. FIG. 12 illustrates four (4) platforms 202 of the ramp systems 10 coupled to the chassis of the vehicle 5, with one platform 202 highlighted. Cross-vehicle components, such as the drive assemblies 210 of each platform 202, are staggered to permit a single design to be used in an interlocking position across the vehicle 5. While the platforms for four ramp systems are illustrated in FIG. 12, other embodiments may include more or fewer ramp systems coupled to the chassis of the vehicle 5.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A ramp system for an automotive vehicle, comprising:
a ramp member comprising an upper ramp surface and a lower ramp surface, the upper ramp surface comprising a retention feature, a first channel, and a second channel, the lower ramp surface comprising a guide member;
a platform comprising an upper platform surface and a lower platform surface, the upper platform surface comprising a guide rail, a tray, and a support assembly disposed within the tray, the support assembly comprising a support member rotatably coupled to the platform via a hinged connection; and
a drive assembly coupled to the platform;
wherein the drive assembly is actuatable to move the ramp member relative to the platform and the support member acts on the lower ramp surface to raise the ramp member from a first loading position to a second loading position.

2. The ramp system of claim 1, wherein the drive assembly is a screw drive assembly comprising a rotatable screw and a drive fork coupled to the screw.

3. The ramp system of claim 2, wherein the ramp member further comprises a drive fork attachment member extending from the lower ramp surface, the drive fork attachment member configured to engage with the drive fork of the drive assembly such that actuation of the screw of the drive assembly translates the ramp member from a first position to a second position.

4. The ramp system of claim 1, wherein the retention feature is an engagement member pivotable from a disengaged position flush with the upper ramp surface and an engaged position extending from the upper ramp surface.

5. The ramp system of claim 4, wherein the engagement member is a hook.

6. The ramp system of claim 4, wherein the engagement member is enclosed by a housing embedded in the upper ramp surface and the engagement member is coupled to an actuation system, the actuation system configured to move the engagement member from a first position to a second position and vice versa.

7. The ramp system of claim 1, wherein the first channel engages with a retention feature of a container and the second channel engages with a wheel of the container and the first channel and the second channel are spaced apart a predetermined distance.

8. The ramp system of claim 1, wherein the platform is coupled to a chassis of the automotive vehicle.

9. The ramp system of claim 1, wherein the lower ramp surface further comprises a plurality of lockdown members.

10. The ramp system of claim 1, wherein the guide rail includes a flange that defines a channel and the guide member travels within the channel to maintain alignment of the ramp member relative to the platform.

11. A storage system for a vehicle, comprising:
a ramp member comprising an upper ramp surface and a lower ramp surface, the upper ramp surface comprising a retention feature, a first channel, and a second channel, the lower ramp surface comprising a guide member;
a platform comprising an upper platform surface and a lower platform surface, the upper platform surface comprising a guide rail, a tray, and a support assembly disposed within the tray, the support assembly comprising a support member rotatably coupled to the platform via a hinged connection;
a drive assembly coupled to the platform; and
a container comprising a body, a plurality of wheels coupled to the body, and at least one lockdown rail coupled to an underside of the body;
wherein the drive assembly is actuatable to move the ramp member relative to the platform and the support member acts on the lower ramp surface to raise the ramp member from a first loading position to a second loading position.

12. The storage system of claim 11, wherein the drive assembly is a screw drive assembly comprising a rotatable screw and a drive fork coupled to the screw and the ramp member further comprises a drive fork attachment member extending from the lower ramp surface, the drive fork attachment member configured to engage with the drive fork of the drive assembly such that actuation of the screw of the drive assembly translates the ramp member from a first position to a second position.

13. The storage system of claim 11, wherein the retention feature is an engagement member pivotable from a disengaged position flush with the upper ramp surface and an engaged position extending from the upper ramp surface.

14. The storage system of claim 13, wherein the engagement member is a hook and the engagement member is enclosed by a housing embedded in the upper ramp surface and the engagement member is coupled to an actuation system, the actuation system configured to move the engagement member from the engaged position to the disengaged position and vice versa.

15. The storage system of claim 14, wherein the container comprises a first lockdown rail and a second lockdown rail spaced apart from and parallel to the first lockdown rail, the first channel engages with the first lockdown rail and the engagement member engages with the second lockdown rail.

16. The storage system of claim 11, wherein the platform is coupled to a chassis of the vehicle.

17. The storage system of claim 11, wherein the guide rail includes a flange that defines a channel and the guide member travels within the channel to maintain alignment of the ramp member relative to the platform.

18. An automotive vehicle, comprising:
a chassis;
a storage system coupled to the chassis, the storage system comprising
a ramp member comprising an upper ramp surface and a lower ramp surface, the upper ramp surface comprising an engagement member, a first channel, and a second channel, the lower ramp surface comprising a guide member and a drive fork attachment member;
a platform comprising an upper platform surface and a lower platform surface, the upper platform surface comprising a guide rail and a support assembly disposed within a tray, the support assembly comprising a support member rotatably coupled to the platform via a hinged connection, wherein the support member acts on the lower ramp surface to raise the ramp member from a first loading position to a second loading position;
a drive assembly coupled to the platform, the drive assembly comprising a rotatable screw and a drive fork coupled to the screw; and
a container comprising a body, a plurality of wheels coupled to the body, a first lockdown rail coupled to an underside of the body, and a second lockdown rail spaced apart from the first lockdown rail and coupled to an underside of the body;
wherein the engagement member engages with the second lockdown rail and the drive fork attachment member of the ramp member engages with the drive fork of the drive assembly such that actuation of the screw of the drive assembly moves the ramp member relative to the platform.

* * * * *